(12) United States Patent
Ikeda

(10) Patent No.: US 7,131,138 B2
(45) Date of Patent: Oct. 31, 2006

(54) INFORMATION EXCHANGING SYSTEM, INFORMATION COMMUNICATION TERMINAL, INFORMATION EXCHANGING METHOD, AND COMPUTER PRODUCT

(75) Inventor: Minoru Ikeda, Funabashi (JP)

(73) Assignee: Yumirlink, Inc., Tokyo (JP)

( * ) Notice: Subject to any disclaimer, the term of this patent is extended or adjusted under 35 U.S.C. 154(b) by 945 days.

(21) Appl. No.: 09/988,237

(22) Filed: Nov. 19, 2001

(65) Prior Publication Data

US 2002/0144152 A1    Oct. 3, 2002

(30) Foreign Application Priority Data

Mar. 28, 2001  (JP)  ............................. 2001-094347
Jun. 11, 2001  (JP)  ............................. 2001-175874

(51) Int. Cl.
*H04L 9/00*  (2006.01)
*G06F 15/16*  (2006.01)
*G06K 9/00*  (2006.01)

(52) U.S. Cl. ............................. 726/3; 726/4; 713/161; 713/168; 709/227; 709/245; 380/42; 380/212

(58) Field of Classification Search ............... None
See application file for complete search history.

(56) References Cited

U.S. PATENT DOCUMENTS

| 5,305,318 A * | 4/1994 | Ozeki et al. ................. 370/431 |
| 5,781,598 A * | 7/1998 | Hardy, III .................... 375/372 |
| 6,591,272 B1 * | 7/2003 | Williams ..................... 707/102 |
| 6,732,331 B1 * | 5/2004 | Alexander ................... 715/513 |
| 2002/0003881 A1 * | 1/2002 | Reitmeier et al. .......... 380/210 |

* cited by examiner

*Primary Examiner*—Gilberto Barron, Jr.
*Assistant Examiner*—A. Nobahar
(74) *Attorney, Agent, or Firm*—Lowe Hauptman & Berner, LLP

(57) ABSTRACT

Information communication terminals for transmitting/receiving information that includes a plurality of elements are connected to each other via a network. A information communication terminal at a transmitting side sets security-coupling levels to a plurality of elements, sets a dividing rule for dividing the information into a plurality of pieces of loosely coupled information based on the set security-coupling levels, divides the information into a plurality of pieces of loosely coupled XML data based on the set dividing rule, and transmits the divided plurality of pieces of loosely coupled XML data and the set dividing rule.

7 Claims, 14 Drawing Sheets

□ GENERATED RE-COUPLING INFORMATION

ORIGINAL XML

```
<my-card>
    <card-no>12346789799</card-no>      ---CARD NUMBER
  <password>2345</password>      ----PASSWORD
    <expiored>2004/01/01</expiored>    ---VALIDITY
</my-card>
```

FIG.13

DIVIDING / RE-STRUCTURING RULE

```
<declare variable="@num" binding="abc/zzz:xyz/hed:mix/ifs"/>
<abc>
<xxx source="my-card/card-no"/>
    <zzz source="@num=@random(@timeday)"/>
</abc>
<xyz>
    <123 source="my-card/password"/>
    <hed source="@num"/>
</xyz>
<mix>
    <dsn source="my-card/ expired "/>
    <ifs source="@num"/>
</mix>
```

FIG.14

LOOSELY-JOINED XML DATA

```
<abc>
    <xxx>12346789799</xxx>        ---CARD NUMBER
    <zzz>gj56a02j</zzz>           --- GENERATED MEDIATION KEY
</abc>
```

```
<xyz>
    <123>2345</123>               ----PASSWORD
    <hed>gj56a02j</hed>           ---MEDIATION KEY
</xyz>
```

```
<mix>
    <dsn>2004/01/01</dsn>         ---VALIDITY
    <ifs>gj56a02j</ifs>           ---MEDIATION KEY
</mix>
```

FIG.15

```
<buffer>
<binding></binding>      MEDIATION KEY FOR COUPLING
<my-card>
   <card-no></card-no>      ---CARD NUMBER
   <password></password>    ----PASSWORD
   <expired></expired>   ---VALIDITY
</my-card>
</buffer>
```

FIG.16

INITIAL STATUS OF BUFFER

```
<buffer>
<binding> </binding>
<my-card>
   <card-no></card-no>      ---CARD NUMBER
   <password></password>    ----PASSWORD
   <expired></expired>   ---VALIDITY
</my-card>
</buffer>
```

FIG.17

ORIGINAL XML DATA OF CARD NUMBER

```
<abc>
   <xxx>12346789799</xxx>      ---CARD NUMBER
   <zzz>gj56a02j</zzz>         --- GENERATED MEDIATION KEY
(RANDOM NUMBER AND THE LIKE)
</abc>
```

FIG.18

SET DATA TO CORRESPONDING
CARD NUMBER ELEMENT IN BUFFER

```
<buffer>
<binding> gj56a02j </binding>
<my-card>
    <card-no>12346789799</card-no>    ---CARD NUMBER
    <password></password>      ----PASSWORD
    <expired></expired>   ---VALIDITY
</my-card>
</buffer>
```

FIG.19

SET DATA TO ALL ELEMENTS

```
<buffer>
<binding> gj56a02j </binding>
<my-card>
    <card-no>12346789799</card-no>    ---CARD NUMBER
    <password>2345</password>      ----PASSWORD
    <expired>2004/01/01</expired>   ---VALIDITY
</my-card>
</buffer>
```

INFORMATION EXCHANGING SYSTEM, INFORMATION COMMUNICATION TERMINAL, INFORMATION EXCHANGING METHOD, AND COMPUTER PRODUCT

FIELD OF THE INVENTION

The present invention relates to an information exchanging system, an information communication terminal, an information exchanging method, a program, and a recording medium. The invention particularly relates to an information exchanging system, an information communication terminal, an information exchanging method, a program, and a recording medium for transmitting/receiving information described in the XML.

BACKGROUND OF THE INVENTION

The Internet is a means for communications that users can utilize extremely easily and at low cost. However, as the Internet has originally been prepared for open communications and has been utilized for this purpose, the Internet is not suitable as information exchanging means in the field of business-to-business transactions (B2B), i.e., transactions between companies, where secrecy protection of information is required like corporate information and medical information. Therefore, in order to secure safety of communications by overcoming drawbacks of the Internet, various security means have been developed so far.

However, the conventional security means in the Internet have had such problems that the cost of introducing these means is high, and that these means are so complex that it is not easy to use them.

Further, in the case of using a simple encryption system like the SSL (Secure Sockets Layer) that has been widely used in the Internet and that can be introduced relatively easily, this system has had a problem that encryption keys can be relatively easily stolen by third parties.

In the information exchanges like the B2B, there are many cases where the XML (Extensible Markup Language) of which standardization has been progressed by the WWW consortium (W3C) is used as a data description language. Information prepared in the XML uses elements as a basic unit. The "element" consists of an "element name" that is described in both a starting tag and an ending tag as a name associated with an element, an "element content" that is described between the starting tag and the ending tag as contents associated with the element, and an "attribute" that is optionally assigned. The element is defined in the DTD (Document Type Definition). In other words, the XML makes it possible to exchange information (a document) by changing a structure of the information into a document type definition file called the DTD. Based on this, users can prepare and use own tags for assigning a method of expressing a document of the information to be exchanged and adding meanings to character strings in the sentence. As explained above, the XML has functions of high-level structural expression and clear contents expression.

Although the XML has such excellent characteristics, when the XML has been leaked out, the contents of the information can be easily analyzed than other expression means. In other words, according to the information exchanges using the XML, a third party can easily estimate the contents of information (a document) based on the DTD and the XML document. Therefore, this method has a problem in that there is a high risk of the contents of exchanged information (a document) being easily stolen by a third party, as compared with the case of information exchanges using the HTML.

As explained above, the conventional systems have various problems. Consequently, they have not been convenient for users, and they have had poor security.

SUMMARY OF THE INVENTION

It is an object of the present invention to provide an information exchanging system, an information communication terminal, an information exchanging method, a program, and a recording medium, capable of providing security using a relatively easy encryption, capable of protecting secrecy of information even if the encryption has been broken, and capable of realizing low-cost information exchanges with high security by utilizing the open Internet.

In the information exchanging system according to one aspect of the present invention, the information communication terminal that transmits the information includes a security-coupling level setting unit which sets a security-coupling level of the plurality of elements of the information; a dividing rule setting unit which sets a dividing rule that divides the information into a plurality of pieces of loosely coupled information, based on the security-coupling level set by the security-coupling level setting unit; a dividing unit which divides the information into the plurality of pieces of loosely coupled information, based on the dividing rule set by the dividing rule setting unit; and a transmitting unit which transmits the plurality of pieces of loosely coupled information divided by the dividing unit, and the dividing rule set by the dividing rule setting unit. Moreover, the information communication terminal that receives the information includes a receiving unit which receives the plurality of pieces of loosely coupled information, and the dividing rule; and a re-structuring unit which re-structures the information from the plurality of pieces of loosely coupled information, based on the dividing rule received by the receiving unit.

The information exchanging system according to another aspect of the present invention comprises a security-coupling level setting unit which sets a security-coupling level of the plurality of elements; a dividing rule setting unit which sets a dividing rule that divides the information into a plurality of pieces of loosely coupled information, based on the security-coupling level set by the security-coupling level setting unit; a dividing unit which divides the information into the plurality of pieces of loosely coupled information, based on the dividing rule set by the dividing rule setting unit; and a transmitting unit which transmits the plurality of pieces of loosely coupled information divided by the dividing unit, and the dividing rule set by the dividing rule setting unit.

In the information exchanging method according to still another aspect of the present invention, the information communication terminal that transmits the information executes the steps of: setting a security-coupling level of the plurality of elements; setting a dividing rule that divides the information into a plurality of pieces of loosely coupled information, based on the set security-coupling level; dividing the information into the plurality of pieces of loosely coupled information, based on the set dividing rule; and transmitting the plurality of pieces of loosely coupled information to an another information communication terminal. The information communication terminal that receives the information executes the steps of: receiving the plurality of pieces of loosely coupled information, and the dividing rule;

and re-structuring the information from the plurality of pieces of loosely coupled information, based on the received dividing rule.

The computer program according to still another aspect of the present invention stores instructions which when executed realizes the method according to the present invention on a computer.

The computer readable recording medium according to still another aspect of the present invention stores a computer program which when executed realizes the method according to the present invention.

Other objects and features of this invention will become apparent from the following description with reference to the accompanying drawings.

BRIEF DESCRIPTION OF THE DRAWINGS

FIG. 10 is a concept diagram showing an outline of a generation of various kinds of rules used for generating loosely coupled XML in a setting module 102a;

FIG. 13 is a diagram showing one example of a dividing/re-structuring rule according to the present embodiment;

FIG. 14 is a diagram showing one example of loosely coupled XML data divided based on the dividing/re-structuring rule according to the present embodiment;

FIG. 15 is a diagram showing one example of information pooled in a memory of the information communication terminal 100 at a receiving side according to the present embodiment;

FIG. 16 is a diagram showing one example of information stored in a buffer pool in an initial status according to the present embodiment;

FIG. 17 is a diagram showing one example of loosely coupled XML data in a status that a card number element has been divided;

FIG. 18 is a diagram showing a status that a card number "12346789799" has been set to a corresponding card number element in a buffer pool; and FIG. 19 is a diagram showing a result of setting data to each element on a buffer pool after receiving all loosely coupled XML data.

DETAILED DESCRIPTION

Embodiment of an information exchanging system, an information communication terminal, an information exchanging method, a program, and a recording medium relating to the present invention will be explained in detail below with reference to the drawings. It should be noted that the present invention is not limited to these embodiments.

In the following embodiments, there will be explained examples of a case where the present invention has been applied to the XML. However, the application of the present invention is not limited to this case, and it is also possible to apply the invention in a similar manner to all description languages that can define attributes by using tags to predetermined information like the SGML and the HTML.

Figure 1:
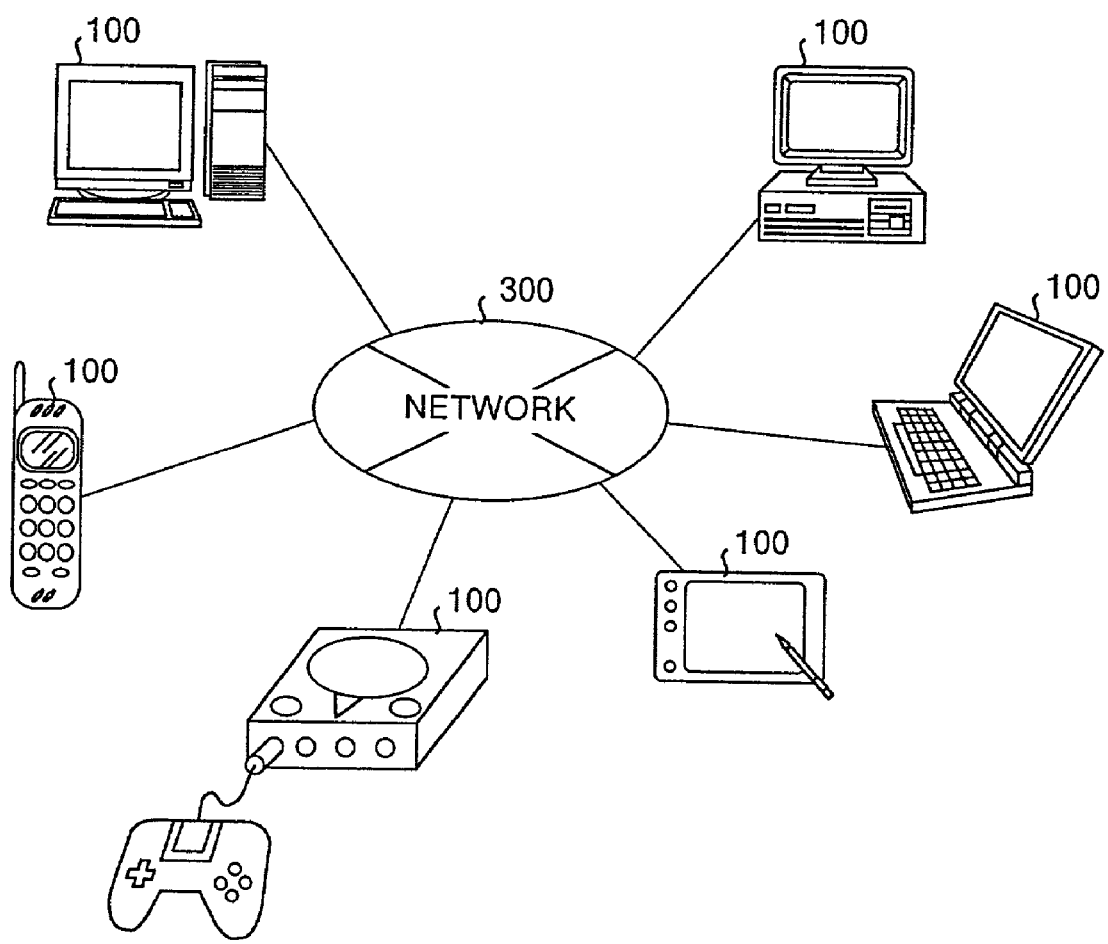
FIG. 1 is a block diagram showing one example of a total structure of the present system.
Figure 2:
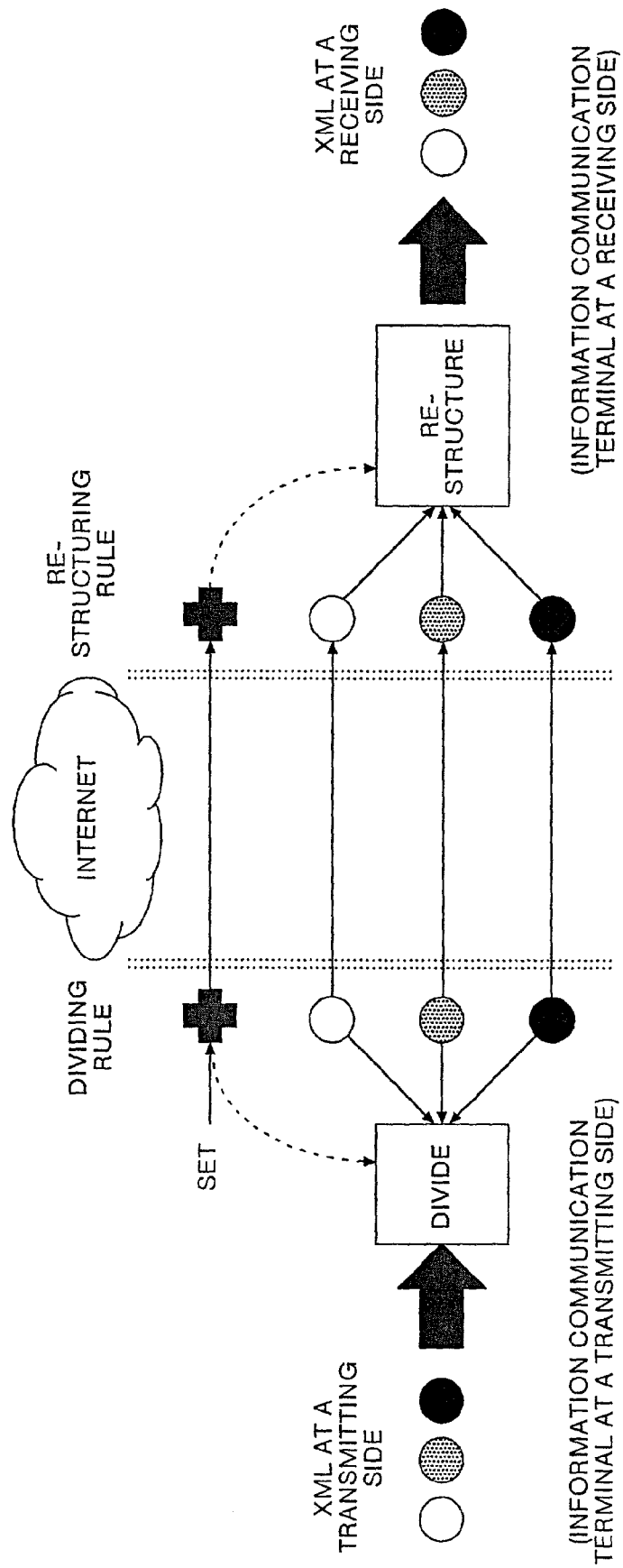
FIG. 2 is a concept diagram showing an outline of the present system.

An outline of the present system will be explained first, and thereafter, a structure and processing of the present system will be explained in detail. FIG. 1 is a block diagram showing one example of a total structure of the present system, and FIG. 2 is a diagram showing a concept of the present system. Both diagrams show concept of only portions relating to the present invention out of the system structure.

The present system has information communication terminals 100 connected to each other via a network 300 so that these terminals can communicate with each other, as schematically shown in FIG. 1. Each information communication terminal 100 may be realized by connecting one or more of a peripheral devices like a printer, a monitor, or an image scanner, when necessary, to a known information processing device like an information processing terminal such as a personal computer, a workstation, a home-game unit, an Internet TV, a PHS terminal, a portable terminal, a mobile communication terminal, or a PDA, and by installing software (including a program and data) for realizing Web information browsing function, e-mail function, and each function described later, to the information processing device.

In short, this system has the following basic characteristics. Namely, information is provided from one information communication terminal 100 to the other information communication terminal 100, via the network 300.

The information is described in the XML, and includes metadata like a tag that has been defined in the DTD (Document Type Definition), for example. These pieces of information are generated by the information communication terminal 100 or other devices, and are stored in the information communication terminal 100.

As shown in FIG. 2, according to this system, information is divided at an information communication terminal 100 at a transmitting side, and the divided information is re-structured at an information communication terminal 100 at a receiving side, based on a dividing rule and a re-structuring rule set at the information communication terminal 100 at the transmitting side. With this arrangement, it is possible to introduce the system easily, without affecting the existing system or application, and it is also possible to obtain high safety.

A concept of the setting of the dividing rule and the re-structuring rule in the information communication terminal 100 of the present system will be explained below.

(1) Security-coupling Level

First, a concept of a "security-coupling level" is introduced.

As described above, the information prepared in the XML has elements defined in the DTD as a basic unit. As described above, a name, contents, and an attribute of each element are defined in the DTD.

A secrecy protection level that a user expects is different, in many cases, depending on a combination of elements that constitute information to be exchanged. For example, among corporate information, as a company name and a president name are open information, the information prepared by combining these pieces of information has a low security level (because this is only a combination of pieces of open information). When only the information of a closed element like a company loss amount is exchanged, it is not possible to identify a company that has generated this loss, even if this information has been leaked out. Therefore, there is little damage in this case.

However, when a closed element and an open element have been combined together, there is a high risk that the closed element is identified in detail based on the open information, when the contents of this combined information have been leaked out.

Therefore, according to the present system, a "recording medium" is defined for each combination of specific elements, and the combination of elements is checked from a viewpoint of a security level.

In other words, in the present system, a security-coupling level of a combination of each element defined in the DTD and other element is assigned, based on a name, contents, and an attribute of each element defined in the DTD. A "security-coupling level" is a value that shows whether the security of information becomes higher or not based on a combination of a plurality of elements, when these elements have been combined together. For example, a high numerical value is set when the security is high. For example, a user may assign a security-coupling level based on each combination of elements that are displayed, by making a display of a name, contents, and an attribute of each element on a monitor. Alternatively, the information communication terminal 100 may automatically assign a security-coupling level based on information of a name, contents, and an attribute of each element.

One example of a case where the information communication terminal 100 assigns a security-coupling level automatically based on information of a name, contents, and an attribute of each element will be explained below. As an attribute that is essential for each element, information on whether the contents of the element are open information or not (hereinafter to be referred to as an "open attribute") is defined in the DTD. Then, the information communication terminal 100 judges the open attribute of each element, and automatically sets a high security-coupling level between an element that becomes open information and an element that becomes closed information.

A security-coupling level is not limited to a relationship between two elements. For example, when a security level becomes high only when three or more elements have been combined together, the security level is set high based on the combination of three or more elements.

Figure 6:
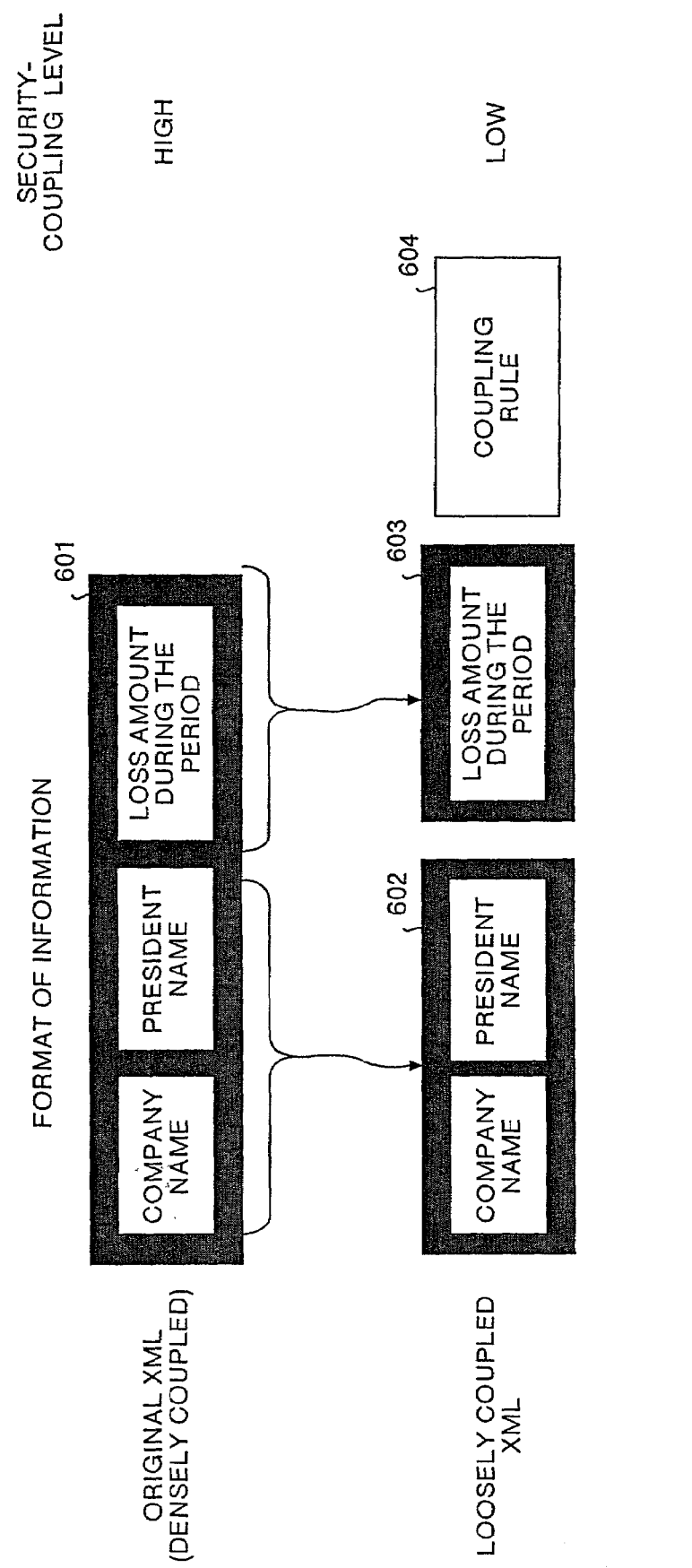
FIG. 6 is a concept diagram showing one example of a definition of a security-coupling level in the present system.

FIG. 6 is a concept diagram showing one example of a definition of a security-coupling level in the present system.

In FIG. 6, information 601 of an original XML includes a company name, a president name, and a loss amount during the period, as elements. A user defines that a security-coupling level is low for a combination of the company name and the president name, as these names are open. On the other hand, the user defines that a security-coupling level is high for a combination of the company name and the company loss amount, as the company loss amount is highly confidential information.

Assume that a dividing rule for dividing these three elements according to a high and a low of a security-coupling level is generated. Based on this dividing rule, these three elements are divided into two of information 602 that includes a company name and a president name, and information 603 that includes only a loss amount. Then, a security-coupling level of each of the two sets of information is lowered. Each of the two divided sets of information has a loose coupling of security so long as the relationship between the two is not made clear. Therefore, the security-coupling level is lowered as a whole.

The present system increases the protection of the secrecy of XML data by lowering a security-coupling level taking advantage of the easiness of dividing and re-structuring the XML data. XML data that has been divided for the purpose of lowering the coupling level will be called "loosely coupled XML data". Communication parties concerned can re-structure and confirm the information by mutually exchanging a repository, a DTD file or other file in which a coupling rule 604 (that is, a rule of conversion between loosely coupled XML and densely-coupled XML, and this becomes a dividing rule and a re-structuring rule to be described later) has been recorded.

(2) Multi-routing of Loosely Coupled XML Data

As described above, a plurality of loosely coupled XML data generated by lowering the security-coupling level can be transmitted through respective separate communication paths to exchange information. With this arrangement, it is possible to conceal the relationship between these pieces of information, thereby to perform a complete protection of the secrecy of the information. In this way, the present system increases the security of the generated loosely coupled XML data by multi-routing these data using the separate communication paths. The number of routing is variable.

Figure 7:
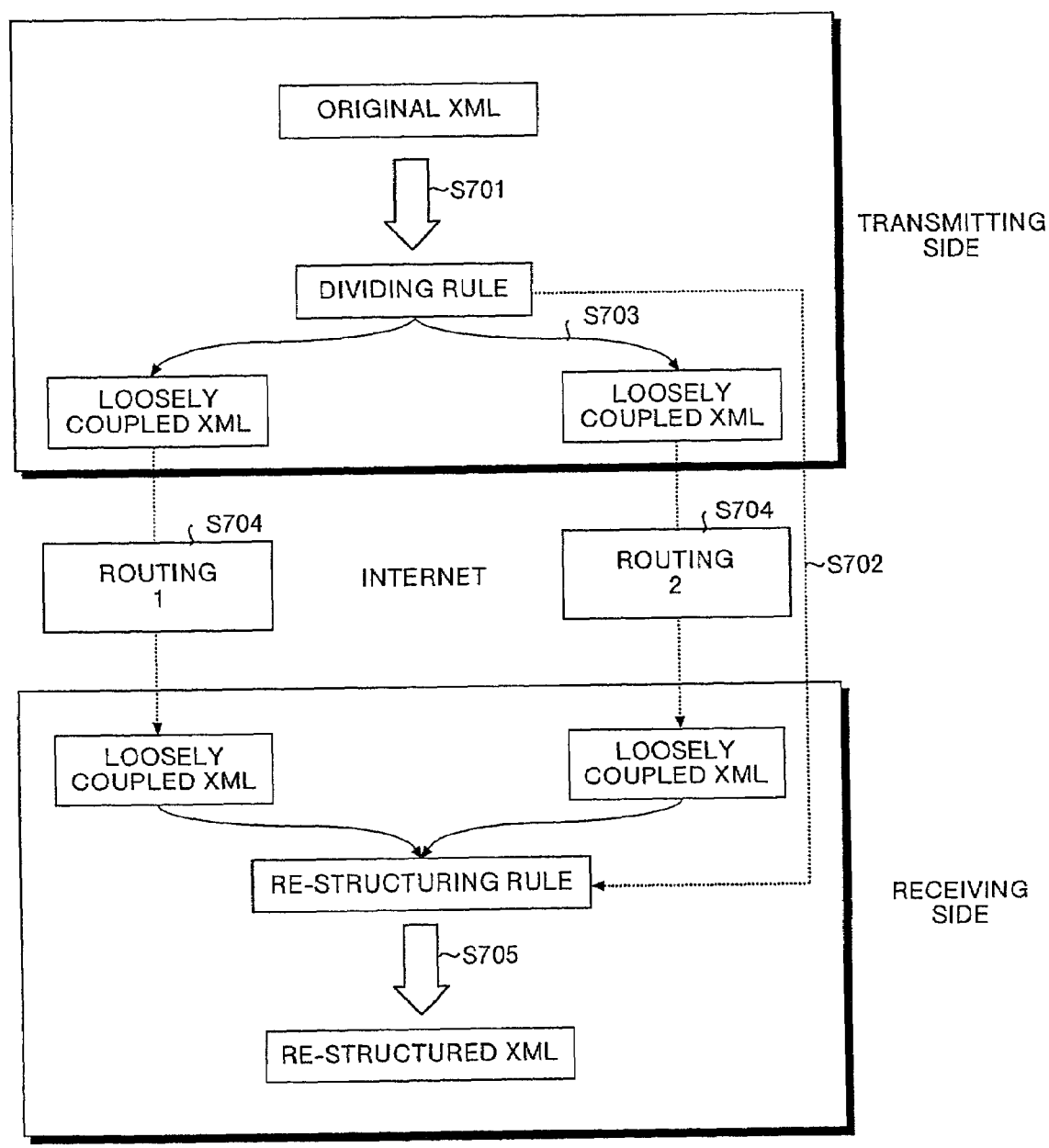
FIG. 7 is a diagram showing a concept of a multi-routing of loosely coupled XML data according to the present invention.

FIG. 7 is a diagram showing a concept of a multi-routing of loosely coupled XML data according to the present invention.

As shown in FIG. 7, the original XML data follows a rule generated based on the DTD and a security-coupling level assigned by a user (step S701), and is divided into a plurality of loosely coupled XML data (step S703). Then, the divided loosely coupled XML data are transmitted to a receiving side through a plurality of transmission paths (step S704).

At the receiving side, the loosely coupled XML data received from the plurality of transmission paths are re-structured based on the rule transmitted separately (step S702), and the XML data that is the same as the original XML is obtained (step S705).

(3) Separate Names of Elements

The XML has a function of high-level expressing of a structure and clear expression of contents, as described above. Although the XML has such excellent characteristics, when the XML has been leaked out, it is much easier to analyze the contents of the information by using this XML than other expression means. Particularly, as the names of elements directly show the contents of the elements for the purpose of application, it is easily possible to estimate the contents of the elements from the names of the elements.

Therefore, in the present system, separate names are attached to the elements in stead of their original names. This function of attaching separate names is for generating XML that has a separate name and a separate structure from the original XML. Based on this function, it is possible to make it difficult to estimate the original information.

Figure 8:
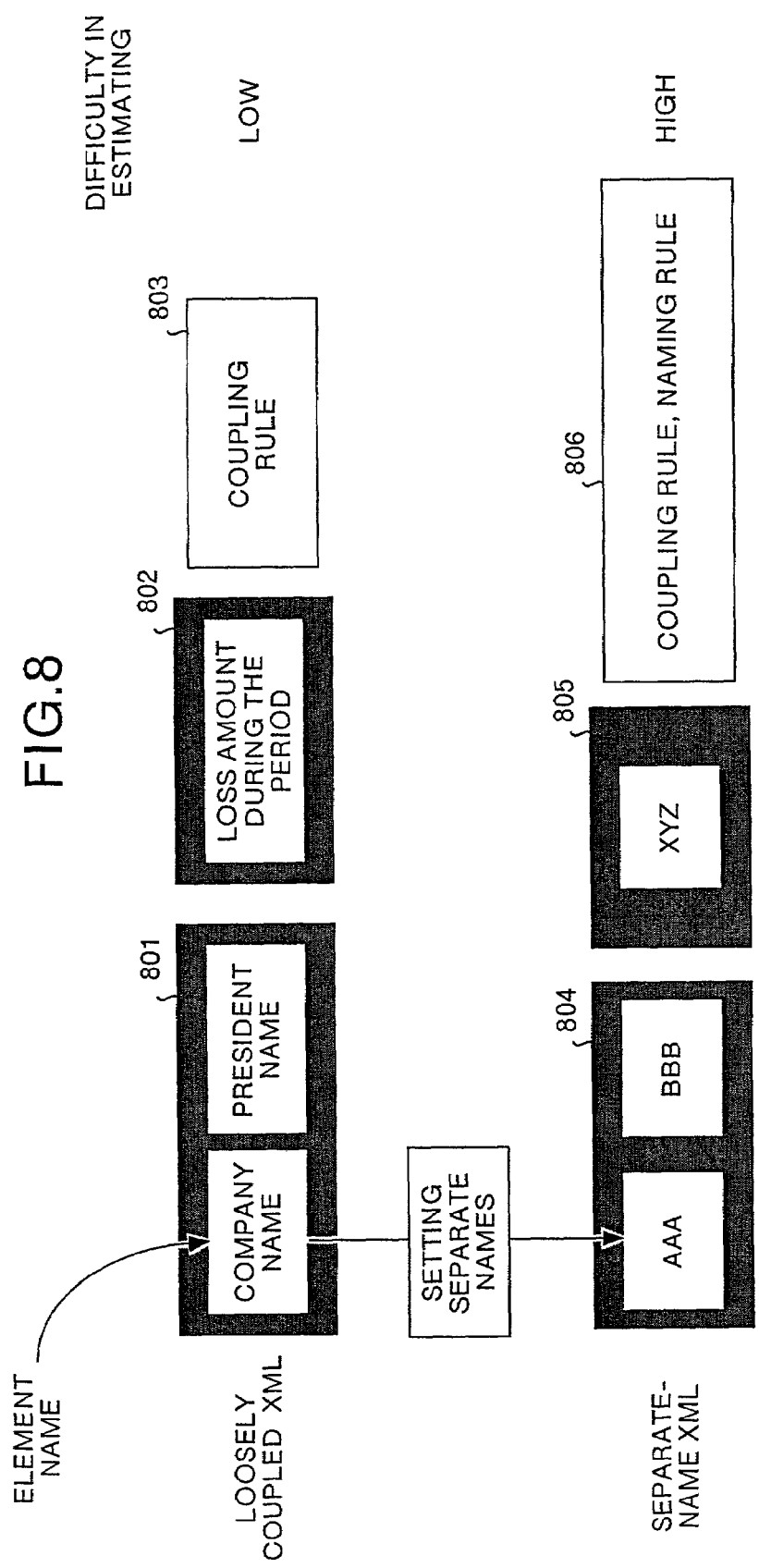
FIG. 8 is a diagram showing a concept of providing separate names to elements according to the present invention.

FIG. 8 is a diagram showing a concept of providing separate names to elements according to the present invention.

As explained above, when loosely coupled XML data (801 and 802) and a coupling rule 803 have been generated from densely-coupled XML data, separate names are attached to elements. Providing "separate names" means a replacement of the element names with corresponding separate names according to a naming rule.

For example, as shown in FIG. 8, a naming rule is set based on a correspondence table for replacing "company name" with "AAA", replacing "president name" with "BBB", and replacing "loss amount in a corresponding period" with "XYZ". Then, XML having separate names (hereinafter to be referred to as "separate-name XML") 804 and 805 are prepared, and the coupling rule and the naming rule are managed in a set of information 806.

In this case, the naming rule may be based on a conversion using the above correspondence table, or may be based on a conversion using an algebraic algorithm like a hash function.

A structure of the present system for embodying the basic characteristics will be explained below.

Figure 3:
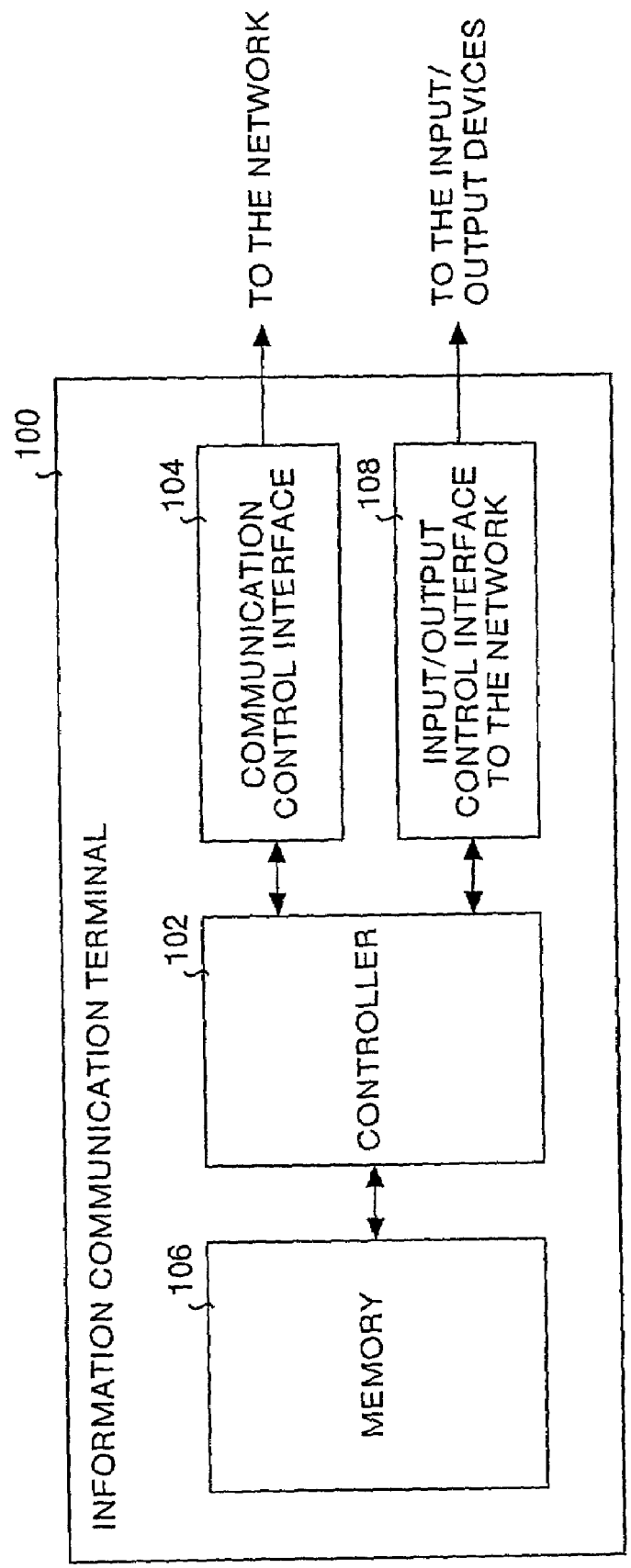
FIG. 3 is a block diagram showing one example of a structure of an information communication terminal 100 to which the present invention is applied.

First, a structure of the information communication terminal 100 will be explained. FIG. 3 is a block diagram showing one example of a structure of the information communication terminal 100 to which the present invention is applied. This shows a concept of only portions of the structure relating to the present invention. In FIG. 3, the information communication terminal 100 is constructed of a controller 102 like a CPU for controlling the whole information communication terminal 100, a communication control interface 104 connected to a communication device (not shown) like a router that is connected to a communication line or the like, an input/output control interface 108 connected to input/output devices (not shown), and a memory 106 for storing various kinds of data. These sections are connected to be able to communicate via optional communication paths. Further, this information communication terminal 100 is connected to a network 300 so as to be able to communicate with this via a communication device like a router and an exclusive cable or radio communication line.

The memory 106 is a storage like a fixed disk unit, for storing various kinds of programs, tables, files, databases, and Web page files that are used for various kinds of processing and Web sites. The memory 106 of the information communication terminal 100 stores, for example, a repository for the DTD, XML data and schema, and various kinds of rule information like a coupling rule and a naming rule.

In FIG. 3, the communication control interface 104 performs a communication control between the information communication terminal 100 and the network 300 (or a communication device like a router). In other words, the communication control interface 104 has a function of carrying out data communications with other terminals via the communication line.

Further, in FIG. 3, the input/output control interface 108 controls the input device and the output device. For the output device, a monitor (including a home television) and a speaker can be used. (In the following explanation, the output device will be explained as a monitor.) For the input device, a keyboard, a mouse, and a microphone can be used. Further, a monitor also realizes a pointing device function in co-operation with the mouse.

Further, in FIG. 3, the controller 102 has an internal memory for storing a control program of an OS (Operating System), programs that prescribe various processing procedures, and predetermined data. The controller 102 performs information processing for executing various kinds of processing by using these programs. The controller 102 has functions of a setting module 102*a*, an execution module 102*b*, and an XML middleware 102*c*. Detailed processing of these units will be explained later.

Figure 4:
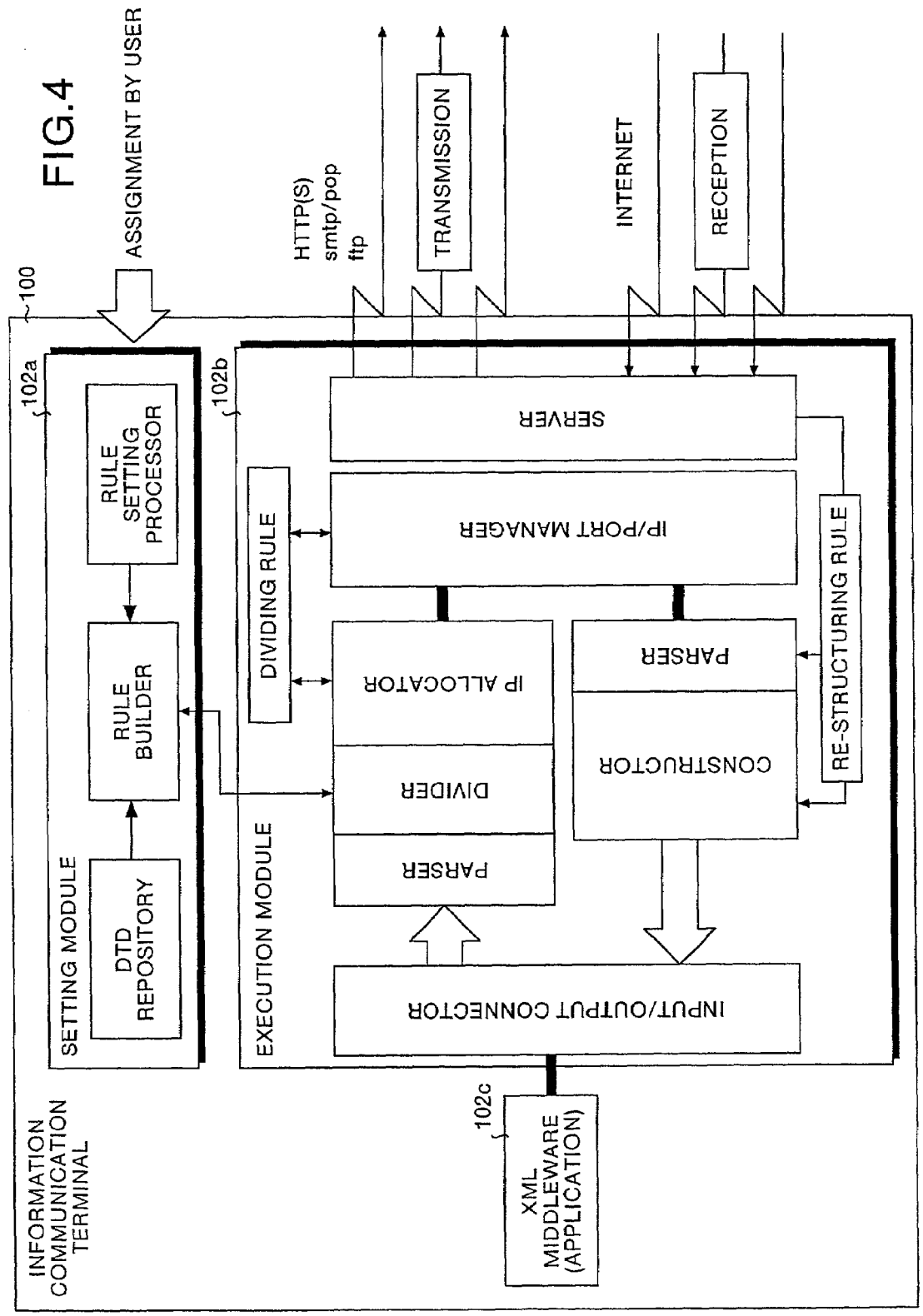
FIG. 4 is a block diagram showing one example of a structure of software executed by a controller 102 of the information communication terminal 100 to which the present invention is applied.

Next, a software structure of the information communication terminal 100 having the above-described structure will be explained with reference to FIG. 4. FIG. 4 is a block diagram showing one example of a structure of software executed by the controller 102 of the information communication terminal 100 to which the present invention is applied. This shows a concept of only portions of the structure that relate to the present invention. In FIG. 4, the information communication terminal 100 includes a setting module 102*a*, an execution module 102*b*, and an XML middleware 102*c*.

In FIG. 4, the setting module 102*a* has a function of setting rules like the above-described coupling rule and the naming rule, and includes a DTD repository, a rule builder, and a rule setting processor as explained below.

(1) DTD Repository

The DTD repository is a memory for storing metadata of the XML data. Assuming an environment of utilizing a plurality of XML business data, it is necessary to provide a system for systematically managing and utilizing the DTD. The DTD is a tool for commonly utilizing a large quantity of DTD on the network, and this manages the DTD and the schema. In general, the DTD repository is structured by software having an information input/output interface function and a storage-area managing function.

(2) Rule Builder

As described above, a data user determines data contents and a security level, and assigns this as a security-coupling level. The rule builder automatically generates various kinds of rules like the coupling rule and the naming rule by referring to the contents assigned by the user and the DTD.

(3) Rule Setting Processor

The rule setting processor displays a rule setting screen (a screen that includes, for example, a display area for displaying a name, contents and an attribute of each element, and an input area for inputting a security-coupling level of each element) on the monitor, and carries out a processing for the user to set various kinds of rules via the input device.

Further, in FIG. 4, the execution module 102*b* has a function of executing a processing of the information received from the XML middleware 120*c*, according to various kinds of rules set by the setting module 102*a*. The execution module 102*b* includes a parser, a divider, an IP allocator, an IP/port manager, a server, a constructor, and an input/output connector that are described below.

(1) Parser

The parser has a function of analyzing a syntax based on the XML standard of W3c, preparing a token, and delivering a result to the divider. In other words the parser is a software program for interpreting a text, judging a logical meaning of the text, and preparing a programming data structure that expresses this meaning. In the present system, the parser may be a tree-based parser or an event-based parser.

Further, the parser has a function of converting a separate name of an element into an original name of the element, based on the naming rule, at the time of a data reception.

(2) Divider

The divider has a function of dividing the XML data according to a rule prepared by the setting module. Further, the divider has a function of attaching a separate name to an element at the time of transmitting data.

(3) IP allocator

The IP locator has a function of allocating or releasing an IP according to a divided number.

(4) IP/Port Manager

The IP/port manager has a function of monitoring and managing resources, as it is necessary to dynamically allocate the resources at the time of utilizing a plurality of IPs and ports.

(5) Server

The server has a server function corresponding to protocols of services like Web, Ftp, and smtp.

(6) Constructor

The constructor has a function of receiving a token generated by the parser, and re-structuring the XML data according to the re-structuring rule.

(7) Input/Output Connector

The input/output connector has a function of carrying out communications with an application system at the outside of the execution module.

In FIG. 4, the XML middleware 102c is a middleware for processing the XML data. The XML middleware 102c has a function of delivering XML data that becomes information to be exchanged, from the application executed by the user to the execution module 102b. Further, the XML middleware 102c has a function of delivering XML data received from other information communication terminal 100 in the execution module 102b, to the application program.

An information flow in the information communication terminal 100 having the above structure will be explained with reference to FIG. 5, FIG. 9 and FIG. 10.

Figure 5:
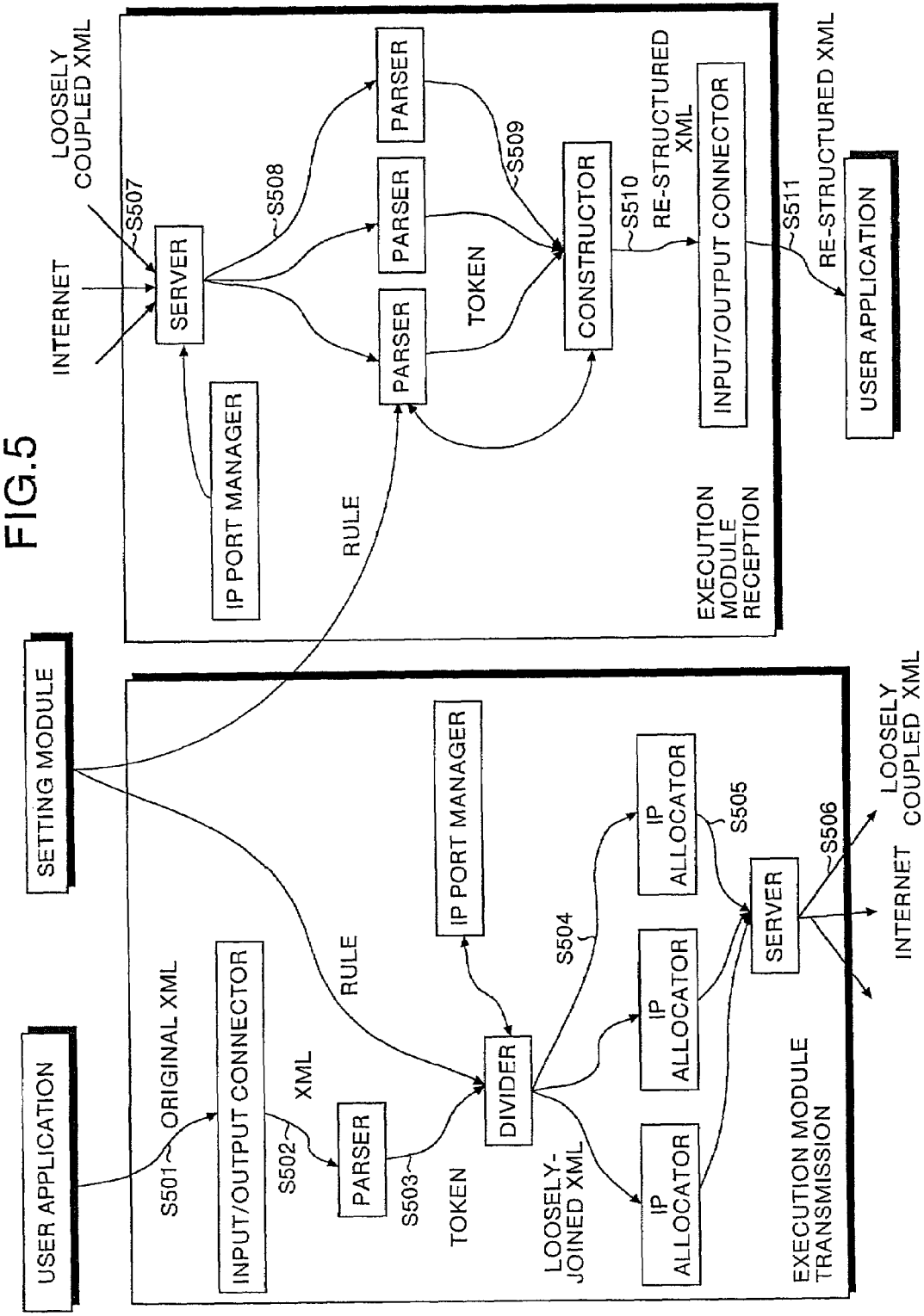
FIG. 5 is a diagram for explaining a concept of an information flow in the information communication terminal 100.

FIG. 5 is a diagram for explaining a concept of an information flow in the information communication terminal 100. An information flow in the information communication terminal 100 at a transmitting side and an information flow in the information communication terminal 100 at a receiving side will be explained separately.

(1) The Information Communication Terminal 100 at a Transmitting Side

First, as an assumption, the setting module 102a generates various kinds of rules that are used for generating loosely coupled XML data. FIG. 10 is a concept diagram showing an outline of a generation of various kinds of rules used for generating loosely coupled XML in the setting module 102a.

A case of processing an XML document relating to corporate information will be explained as an example. The rule setting processor prepares a rule-setting screen or the like by referring to the DTD for corporate information from the DTD repository, and makes a data owner assign a security-coupling level for each element. The rule builder automatically generates a coupling rule and a naming rule (an information communication terminal 1001 and an information communication terminal 1002) based on the contents assigned by the data owner. The generated rules are sent to the information communication terminal 100 at the receiving side.

Then, as shown in FIG. 5, the original XML data generated by the user application is sent to the input/output connector of the execution module 102b via the XML middleware 102c (step S501).

The input/output connector transmits the original XML data to the parser (step S502).

Then, the parser analyzes the original XML data, generates a token, and transmits this to the divider (step S503).

The divider divides the XML data according to the rule generated by the setting module 102a, attaches separate names to the elements, and prepares loosely coupled XML data as described above.

Figure 9:
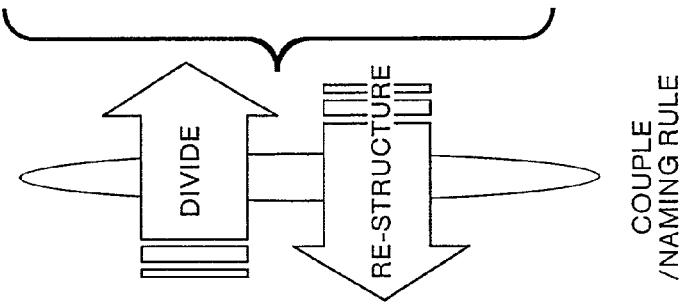
FIG. 9 is a concept diagram showing one example of a preparation of separate names for elements and a generation of loosely coupled XML data that are executed by a divider.
Figure 10:
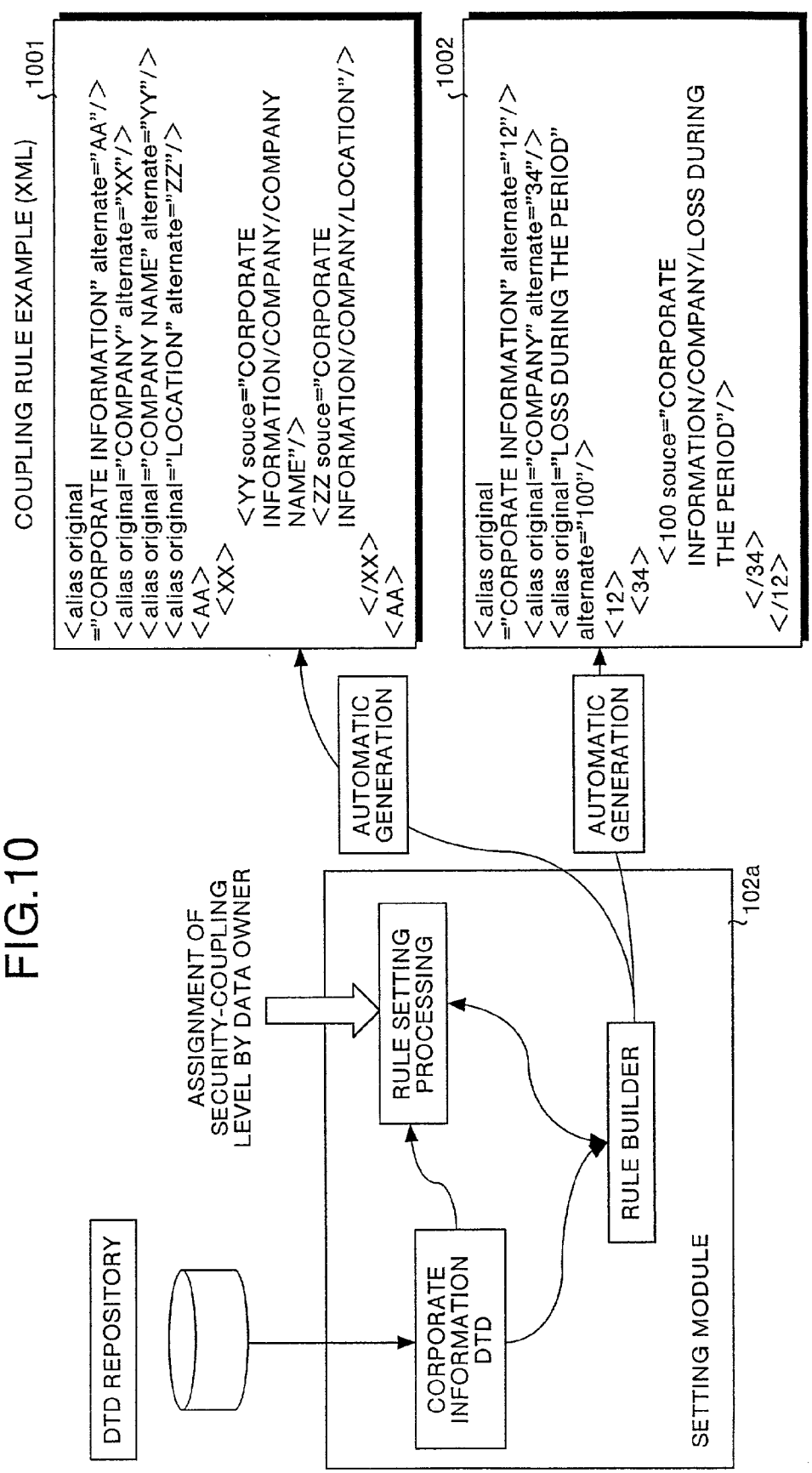

FIG. 9 is a concept diagram showing one example of a preparation of separate names for elements and a generation of loosely coupled XML data that are executed by the divider. In this example, original XML data 901 is loosely coupled to prepare two loosely coupled XML data 902 and 903. At the same time, the divider sets separate names to the elements according to the naming rule. It is extremely difficult for a third party to prepare the original XML data from the loosely coupled XML data.

Referring to FIG. 5 again, the divider allocates the IPs based on the control of an IP allocator, and allocates resources based on the control of the IP/port manager. In order to execute the above-described multi-routing, the divider transmits the loosely coupled XML data to a plurality of IP allocators (step S504).

Then, each IP allocator requests the server to transmit the loosely coupled XML data to the information communication terminal 100 at the receiving side by using separate communication paths (step S505).

The server transmits the loosely coupled XML data to the information communication terminal 100 at the receiving side by using the respective separate communication paths (step S506).

(2) The Information Communication Terminal 100 at a Receiving Side

The server receives the loosely coupled XML data via the network 300 (step S507), and transmits the loosely coupled XML data to the parser (step S508).

The parser restores the original names of the elements from the separate names, based on the DTD file and various kinds of rules received from the information communication terminal 100 at the transmitting side, analyzes the syntax of the loosely coupled XML data, generates a token, and transmits the token to the constructor (step S509).

The constructor re-structures the original XML data from the loosely coupled XML data based on the coupling rule, and transmits the original XML data to the input/output connector (step S510).

The input/output connector transmits the re-structured XML data to the XML middleware 102c. The XML middleware 102c transmits the XML data to the user application (step S511).

Next, a structure of the network 300 shown in FIG. 1 will be explained. The network 300 has a function of connecting between the information communication terminals 100. This is the Internet, for example.

When a card settlement or an Internet debit settlement is to be carried out by utilizing the Internet, it is necessary to input a card number, an account number, a password, and a transaction amount from the screen. In this case, many persons are afraid of flowing secret information onto the Internet. In order to handle such high-secret information on the Internet that is full of various kinds of information having different purposes, contents and qualities under the open environment, it is necessary to remove anxiety of the users and arrange the environment for enabling the users to carry out electronic business transactions with a sense of security.

According to a general encryption method like the SSL (Secure Socket Layer) that has been most widely distributed on the Internet at present, all secret information like an ID and a password is disclosed to a cracker, once the encryption is decrypted by the cracker.

Therefore, through the transmission of high-secret information by dividing the information according to the security-coupling level of the present invention, it is extremely important to prevent a complete recovery of account information, even if any part of the information has been disclosed, thereby to prevent a third party from illegally invading and making settlement.

In this case, information of business transactions that is described in the XML data has a large number of elements, and has a complex structure. Therefore, it is general that, at the time of re-coupling the loosely coupled XML data that has been divided into a plurality of parts, at the receiving side, there exists information for relating between the divided parts of information (re-coupling information).

For example, in the case of order data, it is possible to use common information like a corporate code as re-coupling information.

In the mean time, information for transmitting/receiving an ID or a password generally has two or three elements, and the structure of this information is extremely simple. Therefore, even when divided pieces of this information are to be transmitted through a plurality of different paths for re-coupling at a receiving side, it is easy to estimate the original information when the divided pieces of information are re-coupled in the order of arrival. Consequently, it is not possible to expect a safe re-coupling at the receiving side.

To overcome this difficulty, according to the present embodiment, common elements or attributes that are used for re-coupling the information at the information communication terminal 100 at the receiving side are generated as the re-coupling information at the information communication terminal 100 at the transmitting side. Then, this re-coupling information is added to the original XML data, thereby to maintain a correspondence relationship between the loosely coupled XML data.

Figures 11, 12:
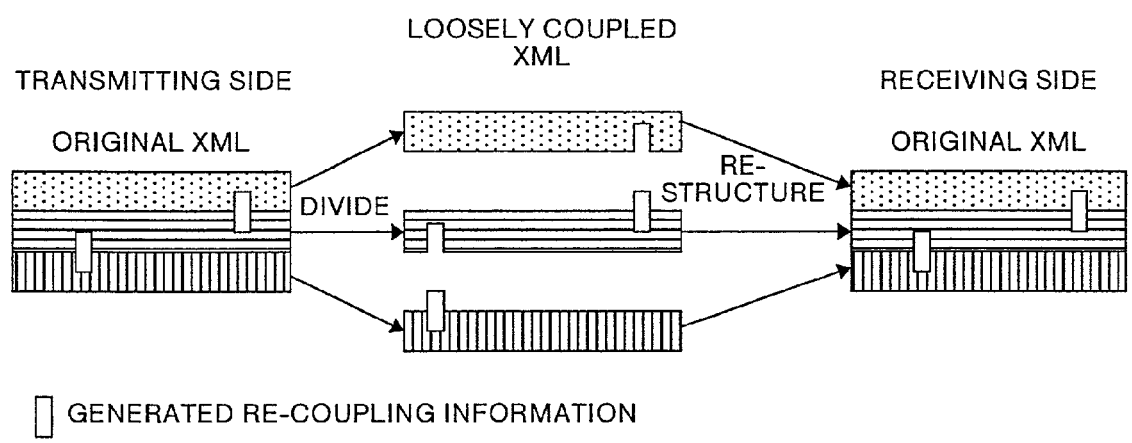
FIG. 11 is a concept diagram showing one example of a case of executing a dividing and a re-structuring of information by using re-coupling information.
FIG. 12 is a diagram showing one example of original XML information that stores card information.

FIG. 11 is a concept diagram showing one example of a case of executing a dividing and a re-structuring of information by using re-coupling information. In FIG. 11, portions displayed as white squares show re-coupling information that have been added to the information (the original XML) that is to be exchanged between the information communication terminals. The re-coupling information is the information that does not exist in the original XML data as the original information. This re-coupling information is prepared at the transmitting side, and is added to the original XML for the receiving side to find correct combinations at the time of re-structuring the original XML data from the received plurality of pieces of the loosely coupled XML data.

It is preferable that the re-coupling information is prepared by using random numbers, in order to make it difficult to estimate the original information as far as possible.

One example of dividing and re-structuring the information by using the re-coupling information will be explained in detail with reference to FIG. 12 to FIG. 19. In the present embodiment, an example of a case of using card data as the original XML information will be explained.

(1) Original XML Information (Card Information)

FIG. 12 is a diagram showing one example of original XML information that stores card information. As shown in FIG. 12, the original XML information consists of elements including a card number, a password, and an effective period.

(2) Dividing/Re-structuring Rule

FIG. 13 is a diagram showing one example of a dividing/re-structuring rule according to the present embodiment. In FIG. 13, @random is a function for generating random numbers, and @timeday is a function for obtaining a current time. In the present embodiment, this dividing/re-structuring rule generates unique random numbers using a current time as seeds, and stores this value in a variable @num, based on these two functions.

In FIG. 13, an instruction for re-coupling loosely coupled XML data is prescribed by the following, at the time of re-structuring:

binding="abc/zzz:xyz/hed:mix/ifs"

In other words, FIG. 13 shows that three elements are mediation keys (re-coupling information) for a re-coupling. Specifically, this shows that an element <zzz> is a mediation key (re-coupling information) in a loosely coupled XML <abc>, an element <hed> is a mediation key (re-coupling information) in the next loosely coupled XML <xyz>, and an element <ifs> is a mediation key (re-coupling information) in the next loosely coupled XML <mix>.

In FIG. 13, the underlined words are reserved words, and their meanings and notations are determined in advance in the present system.

Further, in FIG. 13, the execution and substitution of a function (a word having @) are executed by the information communication terminal 100 at the transmitting side, and a value of this function is firmed up. The firmed-up value is buried into the original XML data, and this original XML data is divided into loosely coupled XML data by using the above-described dividing method. Then, this loosely coupled XML data is transmitted to the receiving side. The information communication terminal 100 at the receiving side utilizes this dividing/re-structuring rule to make reference to know which re-coupling information is a key element for mediating a coupling, and to inversely convert the separate name of an element into the original name. The information communication terminal 100 at the receiving side does not execute the functions.

(3) Loosely Coupled XML Data

FIG. 14 is a diagram showing one example of loosely coupled XML data divided based on the dividing/re-structuring rule according to the present embodiment. FIG. 14 shows loosely coupled XML data that is generated when a mediation key (re-coupling information) is "gj56a02j".

The information communication terminal 100 at the receiving side re-structures the XML data using the mediation key (re-coupling information) shown in the dividing/re-structuring rule, based on these three loosely coupled XML data.

(4) Re-structuring of the Original XML Data at the Receiving Side

The information communication terminal 100 at the receiving side must receive a plurality of loosely coupled XML data as well. As the loosely coupled XML data are transmitted asynchronously, the information communication terminal 100 at the receiving side re-structures the plurality of loosely coupled XML data by pooling the data in the memory of this terminal.

FIG. 15 is a diagram showing one example of information pooled in a memory of the information communication terminal 100 at a receiving side according to the present embodiment. As shown in FIG. 15, the information pooled in a buffer pool for a re-structuring is the information having a binding element attached to the original XML information.

A re-structuring is carried out in the following process, by utilizing this area. FIG. 16 is a diagram showing one example of information stored in a buffer pool in an initial status according to the present embodiment. As shown in FIG. 16, the buffer pool in the initial status is the XML data having vacant values in all elements.

When loosely coupled XML data has been received, a binding element having the same value as the binding key in the received loosely coupled XML data is searched for in the XML data in the buffer pool. When a binding element having the same value has been found, the loosely coupled XML data is set as a corresponding value in the pool.

For example, when loosely coupled XML data having a card number shown in FIG. 17 has been received, a card number "12346789799" is set to a corresponding card number element in the buffer pool, as shown in FIG. 18.

This kind of re-structuring is carried out in a similar manner for the remaining two loosely coupled XML data. FIG. 19 is a diagram showing a result of setting data to each element on a buffer pool after receiving all loosely coupled XML data.

Last, only a my-card element excluding mediation keys (re-coupling information) is extracted, thereby to realize the original XML data as complete information.

In the system, when the three elements of card information have not been completed even after a constant period of time by monitoring the time, re-transmission or re-input of the missing loosely coupled XML data may be asked for.

Further, the example shown in the present embodiment has been explained using XML data of a source format to simplify the explanation. However, it is also possible to carry out all operation for the XML object (DOM).

While the embodiments of the present invention have been explained above, the present invention can also be implemented in various kinds of other embodiments within a range of technical ideal described in the scope of claim for a patent.

Further, all or a part of the processing that is automatically carried out in the above-described embodiments can also be executed manually. Further, all or a part of the processing that is manually carried out in the above-described embodiments can also be executed automatically using a known method.

Except where specified otherwise, it is possible to optionally change information including a processing procedure, a control procedure, a detailed name, various registered data, and parameters for search conditions, a screen example, and a database structure, that have been shown in the above documents and drawings.

Further, regarding the information communication terminal 100, each constituent element shown in the drawings shows only a concept of a function, and it is not always necessary to have a physical structure as shown.

For example, regarding a processing function of the information communication terminal 100, particularly each processing function carried out by the controller, it is possible to realize all or an optional part of this function using a CPU (Central Processing Unit) and a program that is interpreted and executed by the CPU. It is also possible to realize the function based on hardware according to a wired logic.

Further, the information communication terminal 100 may have, as additional constituent elements, an input device (not shown) including various kinds of pointing devices like a mouse, a keyboard, an image scanner, and a digitizer, a display unit (not shown) that is used for monitoring input data, a clock generator (not shown) for generating a system clock, and an output device (not shown) like a printer for outputting various processing results and other data.

The memory for storing various kinds of data is a storage including a memory unit like a RAM and a ROM, a fixed disk unit like a hard disk, and other storage like a flexible disk and an optical disk. This memory stores various kinds of programs, tables, files, databases, and Web page files that are used for various kinds of processing and for providing a Web site.

A detailed mode of distribution and integration of the information communication terminals 100 is not limited to those shown in the drawings. It is also possible to distribute or integrate functionally or physically the whole or a part of the information communication terminals in an optional unit corresponding to load or the like. For example, it is possible to structure each data as an independent database unit, or it is possible to realize a part of the processing using a CGI (Common Gateway Interface).

The whole or apart of the controller of the information communication terminal 100 can be realized using a CPU and a program that is interpreted and executed by the CPU. In other words, the memory is recorded with a computer program for providing an instruction to the CPU and carrying out various kinds of processing in co-operation with the OS (Operating System). This computer program is executed by being loaded on a RAM, and constitutes the controller in co-operation with the CPU.

However, this computer program may also be recorded in an application program server that is connected to the information communication terminal 100 via an optional network. It is also possible to download the whole or a part of the computer program according to the needs. It is possible to realize the whole or an optional part of each controller as hardware according to a wired logic or the like.

Further, the computer program relating to the present invention can be stored in a computer-readable recording medium. In this case, this "recording medium" includes an optional "portable physical medium" like a floppy disk, an optical magnetic disk, a ROM, an EPROM, an EEPROM, a CD-ROM, an MO, and a DVD, an optional "fixed physical medium" like a ROM, a RAM, and an HD that are incorporated in various kinds of computer systems, and a "communication medium" for holding a program during a short period of time like a communication line and a carrier wave in the case of transmitting a program via a network as represented by a LAN, a WAN, and the Internet.

Further, the "computer program" is a data processing method described in an optional language and a description method, and can take a format of a source code or a binary code. The "computer program" is not necessarily limited to a single-unit structure, and can include a distributed structure as a plurality of modules or a library, and a structure that achieves its function in co-operation with other program as represented by an OS (Operating System). Further, it is possible to use known structures and procedures as structures for reading a recording medium and as a reading procedure, and an installation procedure after the reading, in each unit in the embodiment.

Further, the network 300 has a function for connecting between the information communication terminals 100. This network 300 may include any one of the Internet, an intranet, a LAN (including wired and radio), a VAN, a personal computer communication network, a public telephone network (including analog and digital), a dedicated line network (including analog and digital), a CATV network, a portable line exchange network/portable packet communication network of the IMT 2000 system, the GSM system, or the PDC/PDC-P system, a radio call network, a local radio network like the Bluetooth, a PHS network, and a satellite communication network like a CS, a BS, and an ISDB. Namely, the present system can transmit/receive various kinds of data via an optional network regardless of wired or radio.

As explained in detail in the above, according to the present invention, a dividing rule is set for dividing the information into a plurality of pieces of loosely coupled information based on the set security-coupling level, the information is divided into a plurality of pieces of loosely coupled information based on the set dividing rule, and the divided plurality of pieces of loosely coupled information and the set dividing rule are transmitted. Therefore the information exchanging system, information communication terminal, information exchanging method, program, and recording medium that is possible to further increase the security level of the information transmitted/received can be provided.

Furthermore, a plurality of pieces of loosely coupled information and a dividing rule are received, and, information is re-structured based on the received dividing rule. Therefore, it is possible to increase the security of the information transmitted/received.

Moreover, a transmitting unit transmits a plurality of pieces of loosely coupled information by using a plurality of transmission paths. Therefore, it is possible to carry out information exchanges of the plurality of pieces of loosely coupled information generated with a lowered security-coupling level, by using separate communication paths respectively. Further, it is possible to increase the security level of the information transmitted/received, by concealing a relationship between the divided pieces of loosely coupled information.

Furthermore, a naming rule is set that sets separate names to elements instead of their original names, separate names are set to the elements of the information in stead of their original names based on the set naming rule, and the set naming rule is transmitted. Therefore, by generating the information having separate names and structures from the original information, it becomes possible to make it difficult to estimate the original information when the information has been leaked out. As a result, it is possible to further increase the security level of the information transmitted/ received.

Moreover, a naming rule is received, and separate names of elements of the information are changed to their original names, based on the received naming rule. Therefore, by generating the information having separate names and structures from the original information, it becomes possible to make it difficult to estimate the original information when the information has been leaked out. As a result, it is possible to further increase the security level of the information transmitted/received.

Furthermore, the information is described in the XML. Therefore, it is possible to lower the security-coupling level of the XML data by taking advantage of the easiness of dividing and re-structuring of the XML data. As a result, it is possible to increase the security level of the information.

Moreover, a security-coupling level is set based on at least one of names, contents, and attributes of elements, for the elements defined in the DTD. Therefore, it is possible to set the security-coupling level efficiently based on the contents of the elements of the XML information defined in the DTD.

Furthermore, the loosely coupled information includes re-coupling information for re-coupling information in the information terminal device at the receiving side, and the dividing rule includes information for specifying a correspondence between the loosely coupled information and the re-coupling information. Therefore, by additionally providing the re-coupling information for mediating a re-coupling of divided loosely coupled information, it is possible to further increase the security level of the information.

In other words, by adding the re-coupling information generated by random numbers or the like to the loosely coupled information, it makes it difficult for a third party to estimate the contents of the loosely coupled information when the third party has looked at this information. Further, by arranging such that which re-coupling information has been added to which loosely coupled information is defined in the dividing rule, the information communication terminal at the receiving side can re-structure the loosely coupled information to the original information based on the re-coupling information.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information exchanging system comprising a plurality of information communication terminals that exchange information including a plurality of elements,
wherein, of the plurality of information communication terminals an information communication terminal that transmits the information comprises:
a security-coupling level setting unit which sets a security-coupling level of the plurality of elements of the information;
a dividing rule setting unit which sets a dividing rule that divides the information into a plurality of pieces of loosely coupled information, based on the security-coupling level set by the security-coupling level setting unit;
a dividing unit which divides the information into the plurality of pieces of loosely coupled information, based on the dividing rule set by the dividing rule setting unit; and
a transmitting unit which transmits the plurality of pieces of loosely coupled information divided by the dividing unit, and the dividing rule set by the dividing rule setting unit, and
wherein, of the plurality of information communication terminals an information communication terminal that receives the information comprises:
a receiving unit which receives the plurality of pieces of loosely coupled information, and the dividing rule; and
a re-structuring unit which re-structures the information from the plurality of pieces of loosely coupled information, based on the dividing rule received by the receiving unit;
wherein the information communication terminal that transmits the information further comprises:
a naming rule setting unit which sets a naming rule that sets separate names to the elements instead of their original names;
a separate-name setting unit which sets separate names to the elements of the information instead of their original names, based on the naming rule set by the naming rule setting unit; and a naming rule transmitting unit which transmits the naming rule set by the naming rule setting unit, and wherein the information communication terminal that receives the information further comprises:

a naming rule receiving unit which receives the naming rule; and a name changing unit which changes the separate names of the elements of the information to their original names, based on the naming rule received by the naming rule receiving unit.

2. An information communication terminal for transmitting or receiving information including a plurality of elements, the information communication terminal comprising:

a security-coupling level setting unit which sets a security-coupling level of the plurality of elements;

a dividing rule setting unit which sets a dividing rule that divides the information into a plurality of pieces of loosely coupled information, based on the security-coupling level set by the security-coupling level setting unit;

a dividing unit which divides the information into the plurality of pieces of loosely coupled information, based on the dividing rule set by the dividing rule setting unit;

a transmitting unit which transmits the plurality of pieces of loosely coupled information divided by the dividing unit, and the dividing rule set by the dividing rule setting unit;

a naming rule setting unit which sets a naming rule that sets separate names to the elements instead of their original names;

a separate-name setting unit which sets separate names to the elements of the information instead of their original names, based on the naming rule set by the naming rule setting unit; and a naming rule transmitting unit which transmits the naming rule set by the naming rule setting unit.

3. The information communication terminal according to claim 2, further comprising:

a naming rule receiving unit which receives the naming rule; and a name changing unit which changes the separate names of the elements of the information to their original names, based on the naming rule received by the naming rule receiving unit.

4. An information exchanging method that is executed by using an information exchanging system, the information exchanging system comprising a plurality of information communication terminals that exchange information including a plurality of elements, the information communication terminals comprising at least one information communication terminal that transmits the information, and at least one communication terminal that receives the information, the information exchanging method comprising:

steps executed by the information communication terminal that transmits the information, comprising:

setting a security-coupling level of the plurality of elements;

setting a dividing rule that divides the information into a plurality of pieces of loosely coupled information, based on the set security-coupling level;

dividing the information into the plurality of pieces of loosely coupled information, based on the set dividing rule; and transmitting the plurality of pieces of loosely coupled information to another information communication terminal; and steps executed by the information communication terminal that receives the information, comprising:

receiving the plurality of pieces of loosely coupled information, and the dividing rule; and re-structuring the information from the plurality of pieces of loosely coupled information, based on the received dividing rule;

wherein the steps executed by the information communication terminal that transmits the information further comprise:

setting a naming rule that sets separate names to the elements instead of their original names;

setting separate names to the elements of the information instead of their original names, based on the set naming rule set; and transmitting the set naming rule to the information communication terminal that receives the information; and wherein the steps executed by the information communication terminal that receives the information, further comprise:

receiving the naming rule; and changing the separate names of the elements of the information to their original names, based on the received naming rule.

5. A computer program that makes an information exchanging system transmit or receive information including a plurality of elements, the computer program containing instructions for making the information exchanging system execute steps comprising:

setting a security-coupling level of the plurality of elements;

setting a dividing rule that divides the information into a plurality of pieces of loosely coupled information, based on the set security-coupling level;

dividing the information into the plurality of pieces of loosely coupled information, based on the set dividing rule;

transmitting the plurality of pieces of loosely coupled information to another information communication terminal;

setting a naming rule that sets separate names to the elements instead of their original names;

setting separate names to the elements of the information instead of their original names, based on the set naming rule set; and transmitting the set naming rule to the information communication terminal that receives the information.

6. The computer program according to claim 5, further comprising instructions for making the information exchanging system execute the steps of:

receiving the naming rule; and changing the separate names of the elements of the information to their original names, based on the received naming rule.

7. A computer-readable recording medium containing therein a computer program that, when executed, causes an information exchanging system to transmit or receive information including a plurality of elements, the computer program containing instructions that, when executed, cause the information exchanging system to execute steps comprising:

setting a security-coupling level of the plurality of elements;

setting a dividing rule that divides the information into a plurality of pieces of loosely coupled information, based on the set security-coupling level;
dividing the information into the plurality of pieces of loosely coupled information, based on the set dividing rule;
transmitting the plurality of pieces of loosely coupled information to another information communication terminal;

setting a naming rule that sets separate names to the elements instead of their original names;
setting separate names to the elements of the information instead of their original names, based on the set naming rule set; and
transmitting the set naming rule to the information communication terminal that receives the information.

* * * * *

UNITED STATES PATENT AND TRADEMARK OFFICE
CERTIFICATE OF CORRECTION

| | |
|---|---|
| PATENT NO. | : 7,131,138 B2 |
| APPLICATION NO. | : 09/988237 |
| DATED | : October 31, 2006 |
| INVENTOR(S) | : Minoru Ikeda |

It is certified that error appears in the above-identified patent and that said Letters Patent is hereby corrected as shown below:

On Title Page

Item (73) Assignee:

"Yumirlink, Inc.," should be --YMIRLINK Inc.--

Signed and Sealed this

Eighth Day of May, 2007

JON W. DUDAS
*Director of the United States Patent and Trademark Office*